(12) United States Patent
Hisaki et al.

(10) Patent No.: US 11,878,348 B2
(45) Date of Patent: Jan. 23, 2024

(54) THREE-DIMENSIONAL POWDER BED FUSION ADDITIVE MANUFACTURING APPARATUS AND THREE-DIMENSIONAL POWDER BED FUSION ADDITIVE MANUFACTURING METHOD

(71) Applicant: JEOL Ltd., Tokyo (JP)

(72) Inventors: Taku Hisaki, Tokyo (JP); Shinichi Kitamura, Tokyo (JP); Takashi Sato, Tokyo (JP); Ayumu Miyakita, Tokyo (JP); Kozo Koiwa, Tokyo (JP); Yohei Daino, Tokyo (JP); Masahiko Kawakami, Tokyo (JP); Nari Tsutagawa, Tokyo (JP)

(73) Assignee: JEOL Ltd., Tokyo (JP)

( * ) Notice: Subject to any disclaimer, the term of this patent is extended or adjusted under 35 U.S.C. 154(b) by 0 days.

(21) Appl. No.: 17/690,298

(22) Filed: Mar. 9, 2022

(65) Prior Publication Data

US 2022/0288691 A1 Sep. 15, 2022

(30) Foreign Application Priority Data

Mar. 10, 2021 (JP) ................................ 2021-038662

(51) Int. Cl.
*B22F 10/85* (2021.01)
*B33Y 10/00* (2015.01)
(Continued)

(52) U.S. Cl.
CPC .............. *B22F 10/85* (2021.01); *B22F 10/28* (2021.01); *B22F 12/67* (2021.01); *B22F 12/90* (2021.01);
(Continued)

(58) Field of Classification Search
CPC .......... B22F 10/85; B22F 10/28; B22F 12/67; B22F 12/90; B33Y 10/00; B33Y 30/00; B33Y 50/02; Y02P 10/25
See application file for complete search history.

(56) References Cited

U.S. PATENT DOCUMENTS

2015/0270088 A1 9/2015 Satoh
2017/0282248 A1* 10/2017 Ljungblad ................. B22F 7/02
(Continued)

FOREIGN PATENT DOCUMENTS

EP 3769865 A1 1/2021
JP 2015167125 A 9/2015
(Continued)

OTHER PUBLICATIONS

Extended European Search Report issued in EP22160844.1 dated Jul. 8, 2022.
Office Action issued in JP2021038662 dated Apr. 25, 2023.

*Primary Examiner* — Keith Walker
*Assistant Examiner* — Adil A. Siddiqui
(74) *Attorney, Agent, or Firm* — The Webb Law Firm

(57) ABSTRACT

A three-dimensional powder bed fusion additive manufacturing apparatus includes a powder application device that includes a squeegee and applies a powder material to a build plate to form a powder layer, a camera that photographs a manufactured surface of the powder layer, and a determination unit that determines whether powder application failure of the powder material has occurred using an image photographed by the camera while or immediately after the squeegee passes through the manufactured surface.

9 Claims, 13 Drawing Sheets

(51) Int. Cl.
  *B33Y 30/00*  (2015.01)
  *B33Y 50/02*  (2015.01)
  *B22F 12/67*  (2021.01)
  *B22F 12/90*  (2021.01)
  *B22F 10/28*  (2021.01)

(52) U.S. Cl.
  CPC ............... *B33Y 10/00* (2014.12); *B33Y 30/00* (2014.12); *B33Y 50/02* (2014.12)

(56) References Cited

U.S. PATENT DOCUMENTS

2018/0322621 A1  11/2018  Craeghs et al.
2021/0023793 A1  1/2021   Lofving et al.

FOREIGN PATENT DOCUMENTS

JP   20197065 A    1/2019
WO   2017087451 A1 5/2017

* cited by examiner

THREE-DIMENSIONAL POWDER BED FUSION ADDITIVE MANUFACTURING APPARATUS AND THREE-DIMENSIONAL POWDER BED FUSION ADDITIVE MANUFACTURING METHOD

CROSS-REFERENCE TO RELATED APPLICATION

This application claims priority to Japanese Patent Application No. 2021-038662 filed Mar. 10, 2021, the disclosure of which is hereby incorporated by reference in its entirety.

BACKGROUND OF THE INVENTION

Field of the Invention

The present invention relates to a three-dimensional powder bed fusion additive manufacturing apparatus and a three-dimensional powder bed fusion additive manufacturing method.

Description of Related Art

In recent years, a three-dimensional powder bed fusion additive manufacturing (PBF-AM) apparatus is known which irradiates a powder material spread in layers on a build plate with a beam to melt and solidify the powder material, and sequentially stacks the solidified layers by moving the build plate to form a three-dimensional manufactured object. This type of three-dimensional PBF-AM apparatus is described in, for example, JP 2015-167125 A.

In the three-dimensional PBF-AM apparatus described in JP 2015-167125 A, when a powder material is applied onto a build plate, the powder material is not uniformly applied, and powder application failure such as a partial thickness reduction of a powder layer may occur. The occurrence of the powder application failure causes a decrease in dimensional accuracy of the manufactured object.

SUMMARY OF THE INVENTION

The present invention has been made to solve the above problems, and an object thereof is to provide a technique capable of detecting powder application failure of a powder material and suppressing a decrease in dimensional accuracy of a manufactured object due to the powder application failure.

A three-dimensional powder bed fusion additive manufacturing apparatus according to the present invention includes: a build plate; a plate moving device that moves the build plate in an up-down direction; a powder application device that applies a powder material onto the build plate to form a powder layer, the powder application device including a squeegee that moves on the build plate to spread the powder material; a beam irradiation device that irradiates the build plate or the powder layer with a beam; a control unit that controls the plate moving device, the powder application device, and the beam irradiation device to form a manufactured object for one layer through a plate lowering step, a first preheating step, a powder application step, a second preheating step, and a sintering step, and to form a three-dimensional manufactured object by laminating the manufactured object for one layer; a camera that photographs a manufactured surface of the powder layer; and a determination unit that determines whether powder application failure of the powder material has occurred using an image photographed by the camera while or immediately after the squeegee passes through the manufactured surface.

A three-dimensional powder bed fusion additive manufacturing method according to the present invention includes: a first preheating step of preheating a build plate or a powder layer on the build plate; a powder application step of applying a powder material onto the build plate by moving a squeegee in a horizontal direction on the build plate after the first preheating step to form a powder layer; a second preheating step of preheating the powder layer on the build plate after the powder application step; and a sintering step of sintering the powder material forming the powder layer after the second preheating step, in which, in the powder application step, it is determined whether powder application failure of the powder material has occurred using an image of the manufactured surface photographed by a camera while or immediately after the squeegee passes through the manufactured surface of the powder layer.

According to the present invention, it is possible to detect powder application failure of a powder material and suppress a decrease in dimensional accuracy of a manufactured object due to the powder application failure.

DESCRIPTION OF THE INVENTION

Figure 1:
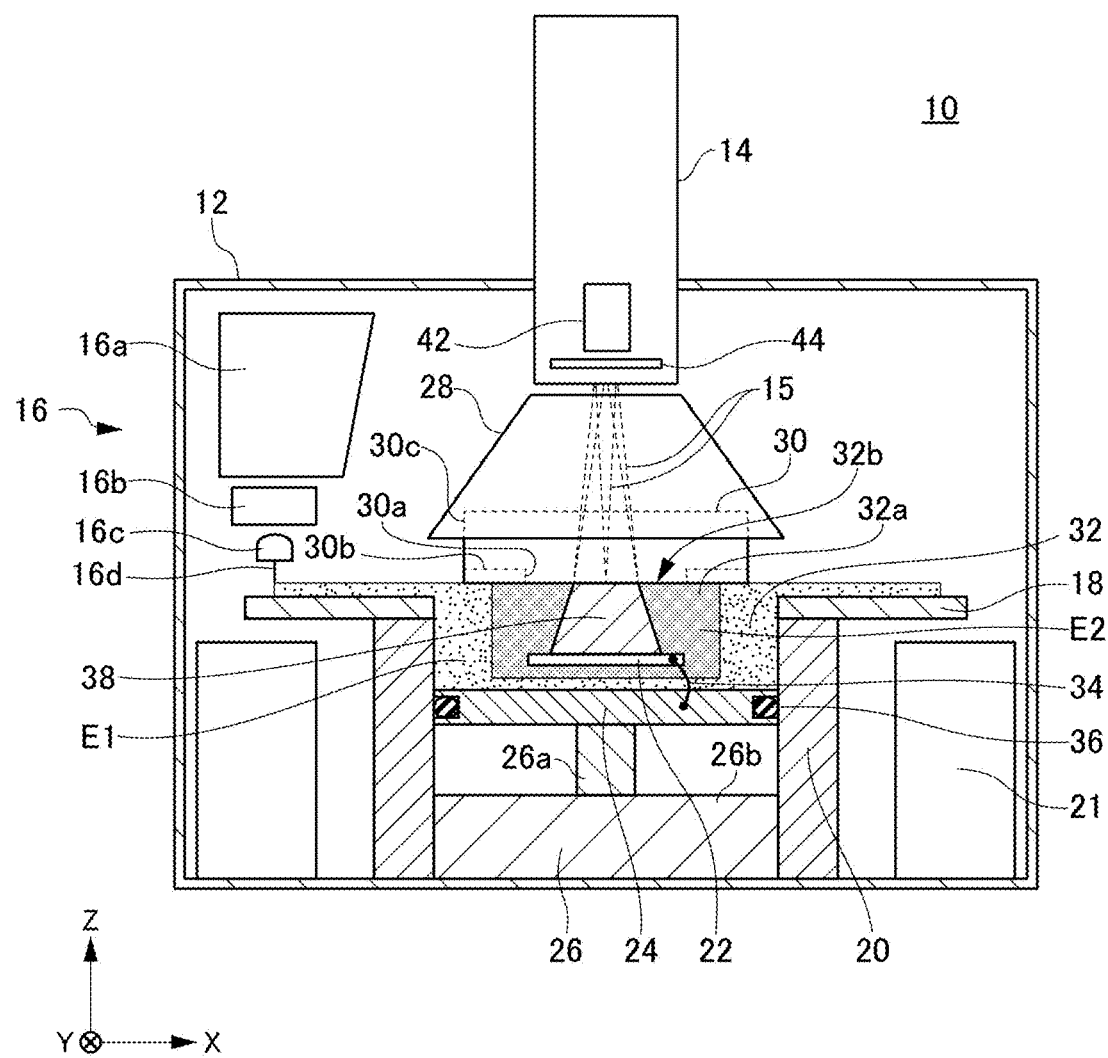
FIG. 1 is a side view schematically showing a configuration of a three-dimensional powder bed fusion additive manufacturing (PBF-AM) apparatus according to a first embodiment of the present invention.

Hereinafter, embodiments of the present invention will be described in detail with reference to the drawings. In the present specification and the drawings, elements having substantially the same function or configuration are denoted by the same reference numerals, and redundant description is omitted.

First Embodiment

FIG. 1 is a side view schematically showing a configuration of a three-dimensional powder bed fusion additive manufacturing (PBF-AM) apparatus according to a first embodiment of the present invention. In the following description, in order to clarify the shape, positional relationship, and the like of each part of the three-dimensional PBF-AM apparatus, the right-left direction in FIG. 1 is referred to as an X direction, the depth direction in FIG. 1 is referred to as a Y direction, and the up-down direction in FIG. 1 is referred to as a Z direction. The X direction, the Y direction, and the Z direction are directions orthogonal to each other. The X direction and the Y direction are parallel to the horizontal direction, and the Z direction is parallel to the vertical direction.

As shown in FIG. 1, the three-dimensional PBF-AM apparatus 10 includes a vacuum chamber 12, a beam irradiation device 14, a powder application device 16, a build table 18, a build box 20, a collection box 21, a build plate 22, an inner base 24, a plate moving device 26, a radiation shield cover 28, an electron shield 30, a camera 42, and a shutter 44.

The vacuum chamber 12 is a chamber for creating a vacuum state by evacuating air in the chamber by a vacuum pump (not shown).

The beam irradiation device 14 is a device that irradiates the build plate 22 or a powder layer 32a with an electron beam 15. The electron beam 15 is an example of a beam. The powder layer 32a is a layer formed by applying metal powder 32 to the build plate 22. Although not shown, the beam irradiation device 14 includes an electron gun that is a generation source of the electron beam 15, a focusing lens that focuses the electron beam generated by the electron gun, and a deflection lens that deflects the electron beam 15 focused by the focusing lens. The focusing lens is configured using a focusing coil, and focuses the electron beam 15 by a magnetic field generated by the focusing coil. The deflection lens is configured using a deflection coil, and deflects the electron beam 15 by a magnetic field generated by the deflection coil.

The powder application device 16 is a device that applies the metal powder 32 onto the build plate 22 to form the powder layer 32a as an example of a powder material as a raw material of a manufactured object 38. The powder application device 16 includes a hopper 16a, a powder dropping device 16b, and a squeegee 16c. The hopper 16a is a chamber for storing metal powder. The powder dropping device 16b is a device that drops the metal powder stored in the hopper 16a onto the build table 18. The squeegee 16c moves in the horizontal direction on the build plate 22 to spread the metal powder 32. The squeegee 16c is an elongated member long in the Y direction, and includes a blade 16d for spreading powder. The squeegee 16c spreads the metal powder 32 on the build table 18 while pushing the metal powder 32 dropped by the powder dropping device 16b with the blade 16d. The squeegee 16c is provided to be movable in the X direction in order to spread the metal powder 32 over the entire surface of the build table 18.

The build table 18 is horizontally arranged inside the vacuum chamber 12. The build table 18 is arranged below the powder application device 16. A central portion of the build table 18 is opened. The opening shape of the build table 18 is a circle in plan view or a square in plan view (for example, a quadrangle in plan view).

The build box 20 is a box that forms a space for manufacturing. An upper end portion of the build box 20 is connected to an opening edge of the build table 18. A lower end portion of the build box 20 is connected to a bottom wall of the vacuum chamber 12.

The collection box 21 is a box that recovers the metal powder 32 supplied more than necessary among the metal powder 32 supplied onto the build table 18 by the powder application device 16.

The build plate 22 is a plate for forming the manufactured object 38 using the metal powder 32. The manufactured object 38 is formed by being laminated on the build plate 22. The build plate 22 is formed in a circle in plan view or a square in plan view in accordance with the opening shape of the build table 18. The build plate 22 is connected (grounded) to the inner base 24 by a ground wire 34 so as not to be in an electrically floating state. The inner base 24 is held at a ground (GND) potential. The metal powder 32 is spread over the build plate 22 and the inner base 24.

The inner base 24 is provided to be movable in the up-down direction (Z direction). The build plate 22 moves in the up-down direction integrally with the inner base 24. The inner base 24 has a larger outer dimension than the build plate 22. The inner base 24 slides in the up-down direction along the inner surface of the build box 20. A seal member 36 is attached to an outer peripheral portion of the inner base 24. The seal member 36 is a member that maintains slidability and sealability between the outer peripheral portion of the inner base 24 and the inner surface of the build box 20. The seal member 36 is made of a material having heat resistance and elasticity.

The plate moving device 26 is a device that moves the build plate 22 and the inner base 24 in the up-down direction. The plate moving device 26 includes a shaft 26a and a drive mechanism unit 26b. The shaft 26a is connected to the lower surface of the inner base 24. The drive mechanism unit 26b includes a motor and a power transmission mechanism (not shown), and drives the power transmission mechanism using the motor as a drive source to move the build plate 22 and the inner base 24 integrally with the shaft 26a in the up-down direction. The power transmission mechanism includes, for example, a rack and pinion mechanism, a ball screw mechanism, and the like.

The radiation shield cover 28 is arranged between the build plate 22 and the beam irradiation device 14 in the Z direction. The radiation shield cover 28 is made of metal such as stainless steel. The radiation shield cover 28 shields radiation heat generated when the metal powder 32 is irradiated with the electron beam 15 by the beam irradiation device 14. When the metal powder 32 is irradiated with the electron beam 15 in order to sinter the metal powder 32, the metal powder 32 is melted. At this time, when heat radiated from a manufactured surface 32b of the powder layer 32a, that is, radiant heat is widely diffused into the vacuum chamber 12, thermal efficiency is deteriorated. On the other hand, when the radiation shield cover 28 is arranged above the build plate 22, the heat radiated from the manufactured surface 32*b* is shielded by the radiation shield cover 28, and the shielded heat is reflected by the radiation shield cover 28 and returned to the build plate 22 side. Therefore, the heat generated by the irradiation of the electron beam 15 can be efficiently used. The manufactured surface 32*b* corresponds to the upper surface of the powder layer 32*a* formed by spreading the metal powder 32 on the build plate 22.

In addition, the radiation shield cover 28 has a function of suppressing adhesion (vapor deposition) of an evaporation material generated when the metal powder 32 is irradiated with the electron beam 15 to the inner wall of the vacuum chamber 12. When the metal powder 32 is irradiated with the electron beam 15, a part of the melted metal becomes an atomized evaporation material and rises from the manufactured surface 32*b*. The radiation shield cover 28 is arranged so as to cover the space above the manufactured surface 32*b* so that the evaporation material does not diffuse into the vacuum chamber 12.

The electron shield 30 has an opening portion 30*a* and a mask portion 30*b*. In forming the manufactured object 38, the electron shield 30 is arranged to cover the upper surface of the metal powder 32, that is, the manufactured surface 32*b*. At this time, the opening portion 30*a* exposes the metal powder 32 spread on the build plate 22, and the mask portion 30*b* shields the metal powder 32 positioned outside the opening portion 30*a*. The shape of the opening portion 30*a* is set in accordance with the shape of the build plate 22. For example, if the build plate 22 is circular in plan view, the shape in plan view of the opening portion 30*a* is set to be circular accordingly, and if the build plate 22 is angular in plan view, the shape in plan view of the opening portion 30*a* is set to be angular accordingly. In the present embodiment, as an example, it is assumed that the shape of the opening portion 30*a* in plan view is circular.

The electron shield 30 is arranged below the radiation shield cover 28. The opening portion 30*a* and the mask portion 30*b* of the electron shield 30 are arranged between the build plate 22 and the radiation shield cover 28 in the Z direction. The electron shield 30 includes a surrounding portion 30*c*. The surrounding portion 30*c* is arranged so as to surround the space above the opening portion 30*a*. A part (upper portion) of the surrounding portion 30*c* overlaps the radiation shield cover 28 in the Z direction. The surrounding portion 30*c* has a function of shielding radiant heat generated from the manufactured surface 32*b* and a function of suppressing diffusion of an evaporation material generated from the manufactured surface 32*b*. That is, the surrounding portion 30*c* has the same function as the radiation shield cover 28.

The electron shield 30 is made of metal having a melting point higher than that of the metal powder 32 used as a raw material of the manufactured object 38. The electron shield 30 is made of a material having low reactivity with the metal powder 32. As a constituent material of the electron shield 30, for example, titanium can be exemplified. The electron shield 30 may be made of metal of the same material as the metal powder 32 to be used. The electron shield 30 is electrically grounded to GND. In a preheating step before a sintering step described later, when the metal powder 32 is calcined by irradiation with the electron beam 15, the electron shield 30 performs an electrical shielding function to suppress the occurrence of powder scattering to a small scale.

The camera 42 is a camera capable of photographing the manufactured surface 32*b* of the powder layer 32*a*. The camera 42 is arranged to be shifted in position in the Y direction from the beam irradiation device 14 so as not to interfere with the position of the beam irradiation device 14. The camera 42 is preferably a visible light camera such as a digital video camera. The camera 42 photographs the manufactured surface 32*b* of the powder layer 32*a* to generate an image (image data) of the powder layer 32*a*. Further, the camera 42 photographs the manufactured surface 32*b* through the opening portion 30*a* of the electron shield 30. Therefore, when the shape of the opening portion 30*a* of the electron shield 30 in plan view is circular, the image of the manufactured surface 32*b* photographed by the camera 42 is a circular image. The photographing by the camera 42 is performed in a state where illumination light emitted from an illumination light source (not shown) included in the three-dimensional PBF-AM apparatus 10 is applied to the manufactured surface 32*b* of the powder layer 32*a*.

In the present embodiment, when the powder layer 32*a* is irradiated with the electron beam 15 from the beam irradiation device 14, the electron shield 30 is arranged so as to cover the manufactured surface 32*b* of the powder layer 32*a*. Therefore, the manufactured surface 32*b* substantially means the manufactured surface 32*b* visible from the camera 42 through the opening portion 30*a* of the electron shield 30. In the case of the three-dimensional PBF-AM apparatus 10 not including the electron shield 30, the upper surface of the metal powder 32 calcined by irradiation with the electron beam 15 corresponds to the manufactured surface 32*b*.

The shutter 44 protects an observation window so that the evaporation material generated from the manufactured surface 32*b* when the metal powder 32 is melted by the irradiation of the electron beam 15 does not adhere to the observation window. The photographing of the manufactured surface 32*b* by the camera 42 is performed in a state where the shutter 44 is opened. In addition, the step in which the evaporation material is likely to be generated and the step in which the amount of the evaporation material generated is large are performed in a state where the shutter 44 is closed. The observation window is attached to the vacuum chamber. The camera is set to the outside of the observation window (atmosphere side), and photographing of the manufactured surface by the camera is performed through the observation window.

Figure 2:
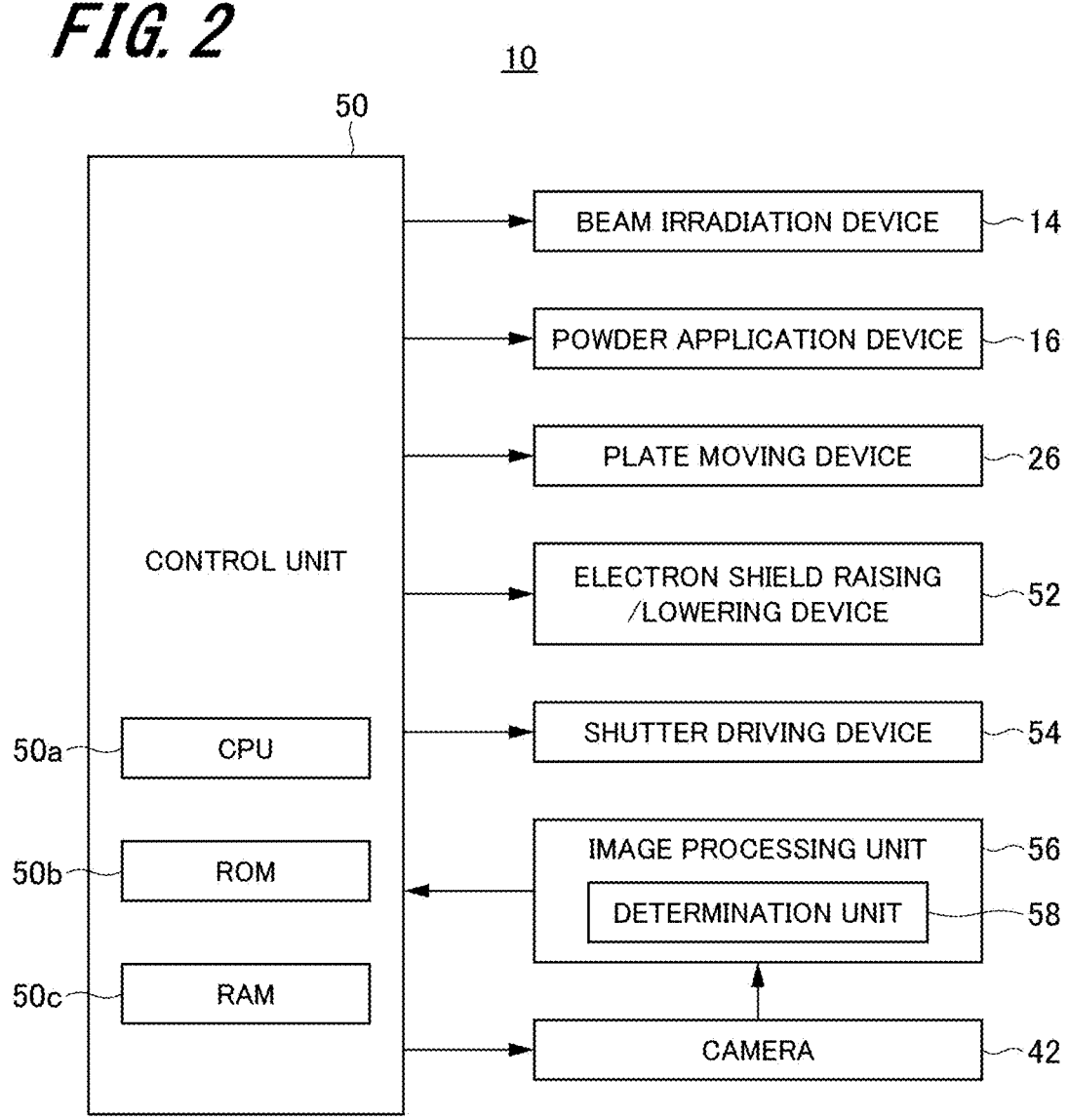
FIG. 2 is a block diagram showing a configuration example of a control system of the three-dimensional PBF-AM apparatus according to the first embodiment of the present invention.

FIG. 2 is a block diagram showing a configuration example of a control system of the three-dimensional PBF-AM apparatus according to the first embodiment of the present invention.

In FIG. 2, a control unit 50 includes, for example, a central processing unit (CPU) 50*a*, a read only memory (ROM) 50*b*, and a random access memory (RAM) 50*c* (not shown), and the CPU 50*a* reads a program written in the ROM 50*b* into the RAM 50*c* and executes predetermined control processing, thereby integrally controlling the operation of the three-dimensional PBF-AM apparatus 10. In addition to the beam irradiation device 14, the powder application device 16, the plate moving device 26, and the camera 42 described above, an electron shield raising/lowering device 52, a shutter driving device 54, and an image processing unit 56 are connected to the control unit 50.

The plate moving device 26 moves the build plate 22 based on a control command given from the control unit 50. The powder application device 16 applies the metal powder 32 onto the build plate 22 based on a control command given from the control unit 50. The operations of the hopper 16*a*, the powder dropping device 16*b*, and the squeegee 16*c* included in the powder application device 16 are controlled by the control unit 50. The electron shield raising/lowering device 52 raises and lowers the electron shield 30 based on a control command given from the control unit 50. The shutter driving device 54 is a device that opens and closes the shutter 44 described above. The shutter driving device 54 opens and closes the shutter 44 based on a control command given from the control unit 50. For example, the shutter driving device 54 suppresses contamination of the observation window by holding the shutter 44 in a closed state in the sintering step described later based on a control command given from the control unit 50.

The image processing unit 56 takes in an image generated by the camera 42 and performs predetermined image processing on the captured image. The image processing unit 56 includes a determination unit 58 that determines the presence or absence of powder application failure when the powder application device 16 applies the metal powder 32. The determination unit 58 determines whether powder application failure has occurred using the image taken in from the camera 42. The image processing unit 56 includes, for example, an image processing processor. Specific processing contents performed by the image processing unit 56 and the determination unit 58 will be described later. The function of the image processing unit 56 may be realized by a CPU, a ROM, and a RAM constituting the control unit 50. That is, the image processing unit 56 can be configured integrally with the control unit 50.

<Operation of Three-Dimensional PBF-AM Apparatus>

Figure 3:
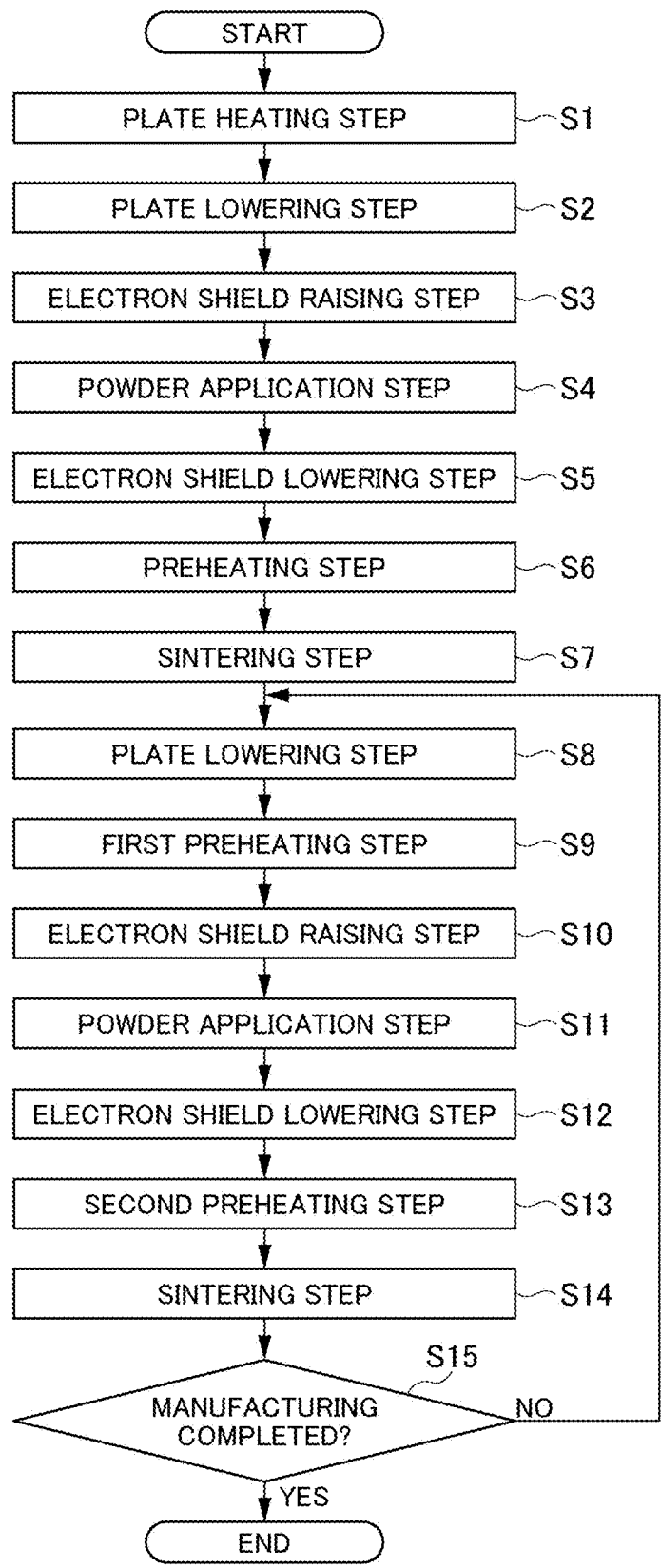
FIG. 3 is a flowchart showing a procedure of a basic processing operation of the three-dimensional PBF-AM apparatus according to the first embodiment of the present invention.

FIG. 3 is a flowchart showing a procedure of a processing operation of the three-dimensional PBF-AM apparatus according to the first embodiment of the present invention. The processing operation shown in this flowchart is performed under the control of the control unit 50.

First, in a state before the manufacturing is started, three sides of the build plate 22 are covered with the metal powder 32 except for the upper surface of the build plate 22. Furthermore, the upper surface of the build plate 22 is arranged at substantially the same height as the upper surface of the metal powder 32 spread on the build table 18. On the other hand, the electron shield 30 is lowered to the upper surface of the build plate 22. In this case, the metal powder 32 present around the build plate 22 is covered by the mask portion 30b of the electron shield 30. The mask portion 30b is in contact with the metal powder 32. The manufacturing is started under the state described above.

(Plate Heating Step)

First, the beam irradiation device 14 operates based on a control command given from the control unit 50 to heat the build plate 22 (step S1).

In step S1, the beam irradiation device 14 irradiates the build plate 22 with the electron beam 15 through the opening portion 30a of the electron shield 30, and scans the build plate 22 with the electron beam 15. Thus, the build plate 22 is heated to a temperature at which the metal powder 32 is calcined.

(Plate Lowering Step)

Next, the plate moving device 26 operates based on a control command given from the control unit 50 to lower the build plate 22 by a predetermined amount (step S2).

In step S2, the plate moving device 26 lowers the inner base 24 by a predetermined amount so that the upper surface of the build plate 22 is slightly lower than the upper surface of the metal powder 32 spread on the build table 18. At this time, the build plate 22 lowers by a predetermined amount together with the inner base 24. The predetermined amount (hereinafter, also referred to as "AZ") described here corresponds to the thickness of one layer when the manufactured object 38 is built by laminating.

(Electron Shield Raising Step)

Next, the electron shield raising/lowering device 52 operates based on a control command given from the control unit 50 to raise the electron shield 30 (step S3).

In step S3, the electron shield raising/lowering device 52 raises the electron shield 30 to a position higher than the squeegee 16c so that the squeegee 16c does not come into contact with the electron shield 30 in the next step S4.

(Powder Application Step)

Next, the powder application device 16 operates based on a control command given from the control unit 50 to apply the metal powder 32 onto the build plate 22 to form the powder layer 32a (step S4).

In step S4, the powder application device 16 drops the metal powder 32 supplied from the hopper 16a to the powder dropping device 16b onto the build table 18 by the powder dropping device 16b, and then moves the squeegee 16c in the X direction to spread the metal powder 32 on the build plate 22. At this time, the metal powder 32 is spread on the build plate 22 with a thickness corresponding to AZ. Thus, the powder layer 32a is formed on the build plate 22. The excess metal powder 32 is recovered in the collection box 21.

(Electron Shield Lowering Step)

Next, the electron shield raising/lowering device 52 operates based on a control command given from the control unit 50 to lower the electron shield 30 (step S5).

In step S5, the electron shield raising/lowering device 52 lowers the electron shield 30 so as to come into contact with the manufactured surface 32b of the metal powder 32. Thus, the metal powder 32 on the build plate 22 is exposed to the outside through the opening portion 30a of the electron shield 30. Further, the metal powder 32 present around the build plate 22 is covered by the mask portion 30b of the electron shield 30.

(Preheating Step)

Next, the beam irradiation device 14 operates based on a control command given from the control unit 50 to preheat the powder layer 32a on the build plate 22 (step S6). In the preheating step S6, the powder layer 32a is preheated in order to calcine the metal powder 32. When the metal powder 32 is calcined, the metal powder 32 can have conductivity. Therefore, powder scattering in the sintering step performed after the preheating step can be suppressed. The preheating performed before the sintering step is also referred to as powder-heat.

In step S6, the beam irradiation device 14 irradiates the metal powder 32 on the build plate 22 with the electron beam 15. At this time, by covering the metal powder 32 with the electron shield 30 and radiating the electron beam 15, the occurrence of powder scattering in the preheating step S6 is suppressed by an electrical shielding effect of the electron shield 30. Furthermore, the beam irradiation device 14 scans an area wider than a region for forming the manufactured object 38 (hereinafter, also referred to as a "manufacturing region") with the electron beam 15. Thus, the metal powder 32 present in the manufacturing region and the metal powder 32 present around the manufacturing region are both calcined.

In FIG. 1, reference numeral E1 denotes a non-calcined region where the non-calcined metal powder 32 is present, and reference numeral E2 denotes a calcined region where the calcined metal powder 32 is present.

(Sintering Step)

Next, the beam irradiation device 14 operates based on a control command given from the control unit 50 to sinter the metal powder 32 by melting and solidification (step S7).

In step S7, the metal powder 32 as a calcined body is sintered by melting and solidifying the metal powder 32 calcined as described above by irradiation with the electron beam 15. In step S7, the beam irradiation device 14 specifies a manufacturing region based on two-dimensional data obtained by slicing three-dimensional CAD data of a target manufactured object 38 to a constant thickness (thickness corresponding to AZ), and scans the manufacturing region with the electron beam 15 to selectively melt the metal powder 32 on the build plate 22. The metal powder 32 melted by the irradiation of the electron beam 15 is solidified after the electron beam 15 passes. Thus, the manufactured object in the first layer is formed.

(Plate Lowering Step)

Next, the plate moving device 26 operates based on a control command given from the control unit 50 to lower the build plate 22 by a predetermined amount (AZ) (step S8).

In step S8, the plate moving device 26 lowers the build plate 22 and the inner base 24 by AZ.

(First Preheating Step)

Subsequently, the beam irradiation device 14 operates based on a control command given from the control unit 50 to preheat the powder layer 32a on the build plate 22 (step S9). In the first preheating step S9, as a preparation for spreading the metal powder 32 in the next layer, the powder layer 32a that has been subjected to the sintering step in the previous layer is preheated. The preheating performed after the sintering step is also referred to as after-heating.

In step S9, the beam irradiation device 14 irradiates the powder layer 32a with the electron beam 15 through the opening portion 30a of the electron shield 30, and scans the powder layer 32a with the electron beam 15. As a result, the powder layer 32a exposed to the opening portion 30a is heated to a temperature at which the metal powder 32 is calcined.

(Electron Shield Raising Step)

Next, the electron shield raising/lowering device 52 operates based on a control command given from the control unit 50 to raise the electron shield 30 (step S10).

In step S10, the electron shield raising/lowering device 52 raises the electron shield 30 to a position higher than the squeegee 16c so that the squeegee 16c does not come into contact with the electron shield 30 in the next step S11.

(Powder Application Step)

Next, the powder application device 16 operates based on a control command given from the control unit 50 to apply the metal powder 32 onto the build plate 22 and form the powder layer 32a (step S11).

In step S11, the powder application device 16 operates similarly to step S4 described above. Thus, on the build plate 22, the metal powder 32 in the second layer is spread over the sintered body formed by the metal powder 32 in the first layer.

(Electron Shield Lowering Step)

Next, the electron shield raising/lowering device 52 operates based on a control command given from the control unit 50 to lower the electron shield 30 (step S12).

In step S12, the electron shield raising/lowering device 52 operates similarly to step S5 described above.

(Second Preheating Step)

Next, the beam irradiation device 14 operates based on a control command given from the control unit 50 to preheat the metal powder 32 forming the powder layer 32a in the second layer (step S13). In the second preheating step S13, the powder layer 32a is preheated in order to suppress powder scattering in the sintering step performed later.

In step S13, the beam irradiation device 14 operates similarly to step S6 described above. As a result, the metal powder 32 forming the powder layer 32a in the second layer is calcined.

(Sintering Step)

Next, the beam irradiation device 14 operates based on a control command given from the control unit 50 to sinter the metal powder 32 forming the powder layer 32a in the second layer by melting and solidification (step S14).

In step S14, the beam irradiation device 14 operates similarly to step S7 described above. Thus, the manufactured object in the second layer is formed.

Next, the control unit 50 confirms whether the manufacturing of the target manufactured object 38 is completed (step S15). When determining that the manufacturing of the manufactured object 38 is not completed, the control unit 50 returns to step S8 described above. As a result, the control unit 50 performs again the processes of steps S8 to S14 described above for each of the third and subsequent layers. When it is determined that the manufacturing of the manufactured object 38 is completed, the series of processing is terminated at that time.

Figure 4:
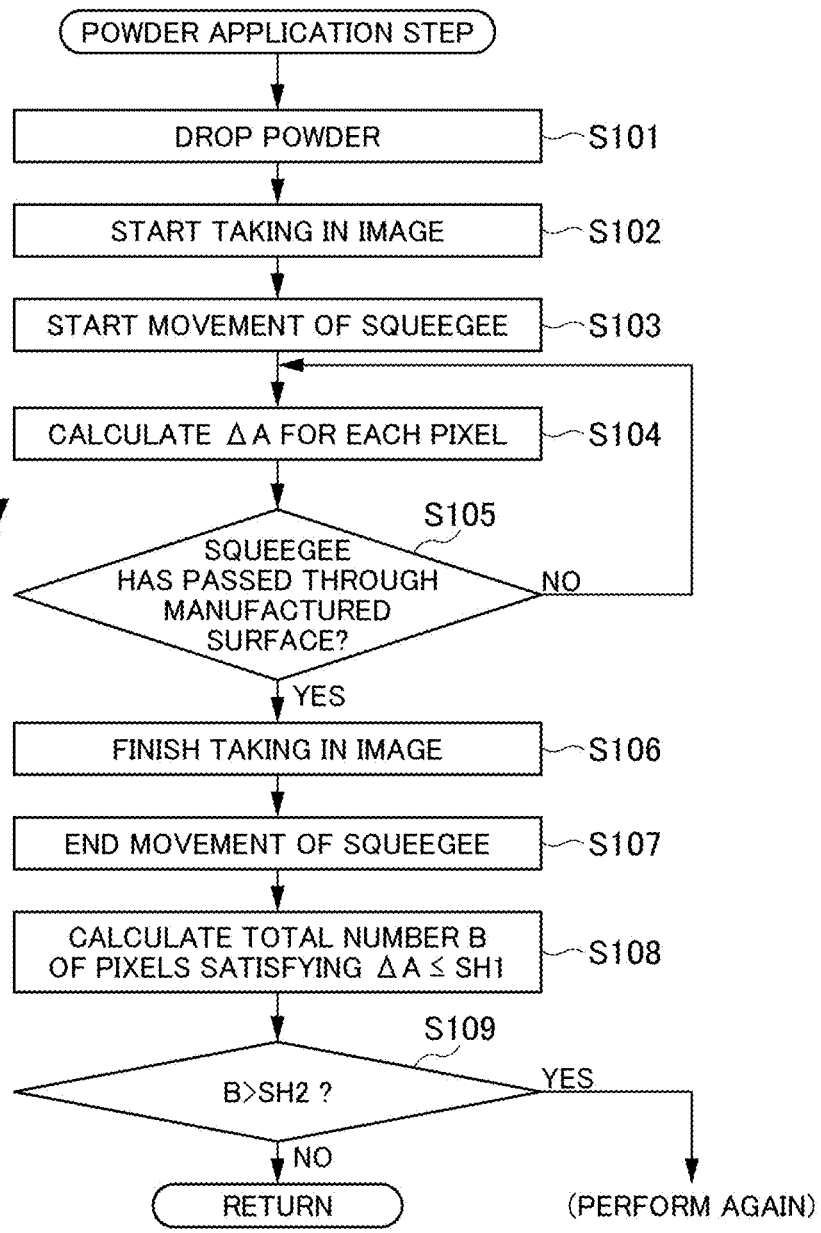
FIG. 4 is a flowchart showing a procedure of a processing operation of the three-dimensional PBF-AM apparatus according to the first embodiment of the present invention.

FIG. 4 is a flowchart showing a processing procedure of the powder application step according to the first embodiment of the present invention. The processing shown in the flowchart is performed under the control of the control unit 50 and applied to step S11 in FIG. 3.

First, under the arrangement state shown in FIG. 1, the powder dropping device 16b drops the metal powder 32 onto the build table 18 according to a control command from the control unit 50 (step S101). At this time, the amount of the metal powder 32 dropped by the powder dropping device 16b corresponds to the application amount necessary to form the powder layer 32a with a thickness of AZ.

Next, the image processing unit 56 starts taking in an image from the camera 42 according to a control command from the control unit 50 (step S102). The camera 42 continuously photographs the manufactured surface 32b of the powder layer 32a after the camera power is turned on under the control of the control unit 50. The image photographed by the camera 42 may be a still image or a moving image. In the case of a still image, an image of the camera 42 is taken into the image processing unit 56 at a predetermined frame rate.

Next, the squeegee 16c starts moving from the left end to the right end on the build table 18 shown in FIG. 1 according to a control command from the control unit 50 (step S103). At this time, the squeegee 16c moves while pushing the metal powder 32 with the blade 16d. The movement of the squeegee 16c is displayed in an image photographed by the camera 42. In the present embodiment, the camera 42 photographs the manufactured surface 32b of the powder layer 32a through the opening portion 30a of the electron shield 30. Therefore, the state of the squeegee 16c passing through the manufactured surface 32b so as to cross the opening portion 30a of the electron shield 30 is displayed in the image photographed by the camera 42. Furthermore, an image photographed by the camera 42 while the squeegee 16c is passing through the manufactured surface 32b is taken into the image processing unit 56.

Next, the determination unit 58 calculates AA for each pixel using the photographed image of the camera 42 obtained at a predetermined frame rate while the squeegee 16c is passing through the manufactured surface 32b (step S104). ΔA is a difference between a predicted feature value of an image immediately after the squeegee 16c passes and a feature value (measured feature value) of an image immediately after the squeegee 16c passes in a frame image representing the state of the manufactured surface 32b in time series. The feature value of the image may be any value as long as the value changes according to the temperature change of the manufactured surface 32b heated in the preheating step before the powder application step. As a preferred example, the feature value of the image is at least one of intensity and saturation of the image. In the present embodiment, a case where the feature value of the image is the intensity of the image will be described as an example. In that case, the predicted feature value of the image described above is replaced with the predicted intensity of the image, and the feature value of the image is replaced with the intensity (measured intensity) of the image.

The predicted intensity of the image is intensity predicted from the temporal change of the intensity of the image before the squeegee 16c passes. The time immediately after the squeegee 16c passes refers to a range of time in which a difference occurs in the feature value (intensity or saturation) of the image to the extent that the case where powder application failure of the metal powder 32 occurs and the case where powder application failure does not occur can be distinguished. The reason why the timing of confirming the difference between the predicted feature value and the measured feature value is limited to immediately after the squeegee 16c passes is as follows.

First, when the metal powder 32 is normally applied by passage of the squeegee 16c, the intensity of the image of the manufactured surface 32b decreases once, then gradually increases with the lapse of time, and then turns to a decreasing trend. On the other hand, when the metal powder 32 is not applied normally, the intensity of the image of the manufactured surface 32b uniformly and gradually decreases. When the time longer than the time immediately after the squeegee 16c passes elapses, there is almost no difference in the intensity of the image between the case where powder application failure of the metal powder 32 occurs and the case where powder application failure does not occur. That is, when a certain period of time or more elapses after the squeegee 16c passes, it becomes difficult to discriminate between a case where powder application failure of the metal powder 32 occurs and a case where powder application failure does not occur. Therefore, the timing of confirming the difference between the predicted feature value and the measured feature value is limited to immediately after the squeegee 16c passes.

The determination unit 58 obtains an approximate expression indicating the temporal change of the intensity based on the temporal change of the intensity of the image before the squeegee 16c passes, and determines the predicted intensity immediately after the squeegee 16c passes according to the obtained approximate expression. Hereinafter, a method of determining the predicted intensity will be described in detail.

Figure 5:
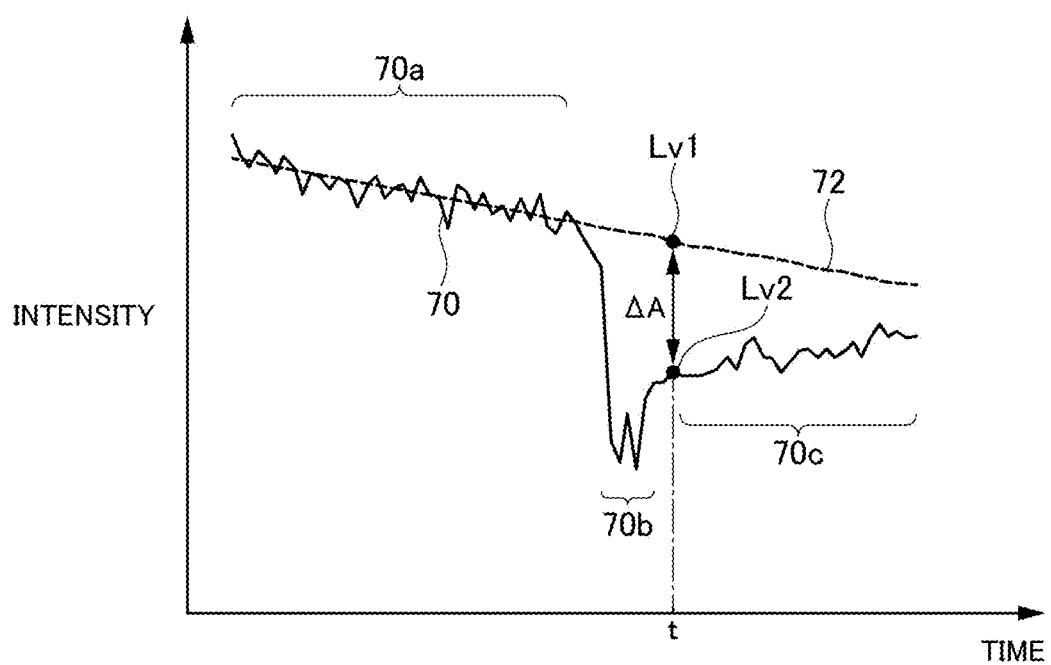
FIG. 5 is a diagram for explaining a relationship between measured intensity of an image and an approximate expression.

FIG. 5 is a diagram for explaining the relationship between the measured intensity of the image and the approximate expression, and the vertical axis of FIG. 5 represents the intensity of the image and the horizontal axis represents time.

Figure 6A:
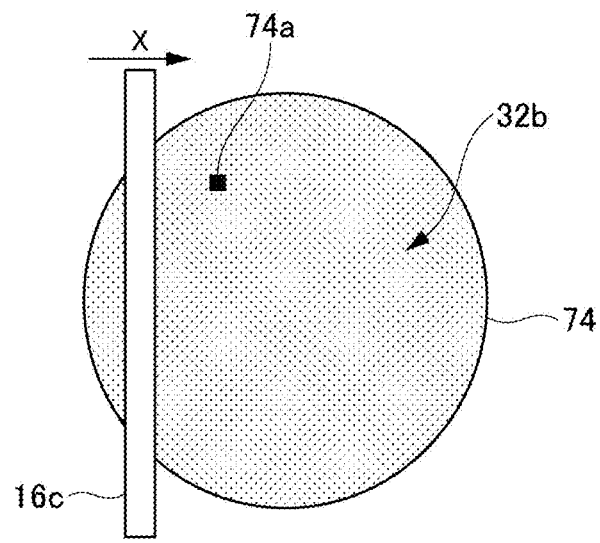
FIGS. 6A to 6C are schematic diagrams showing an example of an image obtained by photographing a manufactured surface with a camera.
Figure 6B:
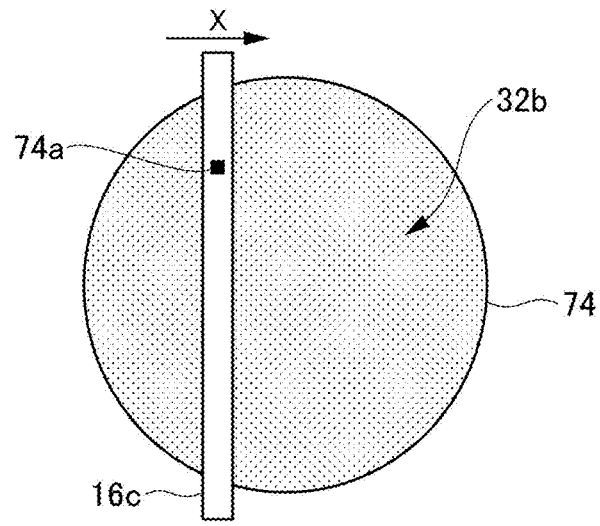
Figure 6C:
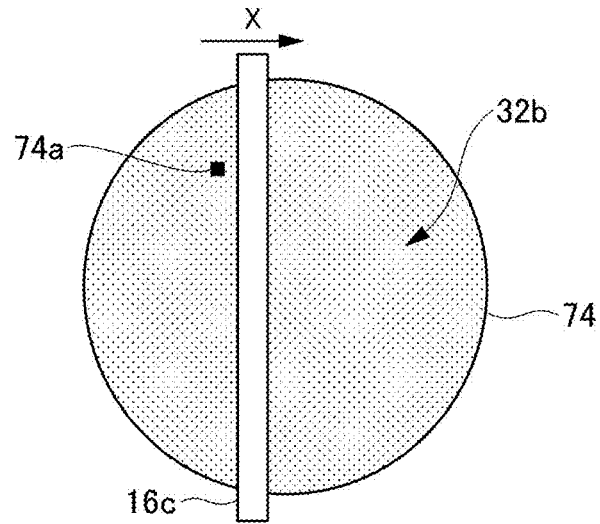

Assuming that the image obtained by photographing the manufactured surface 32b by the camera 42 is an image 74 as shown in FIGS. 6A to 6C, a measured intensity 70 of the image indicates a change in intensity in an optional pixel 74a among a plurality of pixels constituting the image 74. The measured intensity 70 of the image is roughly divided into three periods on the time axis. Specifically, the measured intensity 70 is roughly divided into a measured intensity 70a obtained before the squeegee 16c passes through the pixel 74a as shown in FIG. 6A, a measured intensity 70b obtained while the squeegee 16c passes through the pixel 74a as shown in FIG. 6B, and a measured intensity 70c obtained after the squeegee 16c passes through the pixel 74a as shown in FIG. 6C.

The reason why the measured intensity 70a gradually decreases is that the temperature of the manufactured surface 32b heated and red-heated in the preheating step before the powder application step gradually decreases with the lapse of time, and accordingly, the hue of the manufactured surface 32b gradually decreases. The reason why the measured intensity 70b rapidly decreases is that the squeegee 16c is present in front of the manufactured surface 32b as viewed from the camera 42, and the squeegee 16c is displayed more darkly than the manufactured surface 32b. The reason why the measured intensity 70c gradually increases is that the novel metal powder 32 covering the manufactured surface 32b by the passage of the squeegee 16c is gradually heated by the heat transferred from the manufactured surface 32b, and becomes reddish.

The determination unit 58 obtains an approximate expression indicating a temporal change in the measured intensity 70a obtained before the squeegee 16c passes. The approximate expression 72 can be obtained by, for example, a least squares method. In this case, the approximate expression 72 can be expressed by a straight line indicating the inclination of the change in the measured intensity 70a shown in FIG. 5 or a line close to this straight line. Furthermore, the approximate expression 72 indicates a change in intensity predicted in a case where new metal powder 32 is not applied onto the manufactured surface 32b during and after the passage of the squeegee 16c.

Next, the determination unit 58 determines a predicted intensity Lv1 according to the approximate expression 72 obtained above. Assuming that a time (timing) immediately after the squeegee 16c passes is t, the predicted intensity Lv1 is obtained by inputting the time t into the approximate expression 72 and calculating the time t.

By the above method, the predicted intensity immediately after the squeegee 16c passes can be determined.

Next, the determination unit 58 acquires a measured intensity Lv2 obtained at the time t immediately after the squeegee 16c passes.

Next, the determination unit 58 calculates the difference between the predicted intensity Lv1 and the measured intensity Lv2 described above as ΔA. That is, the determination unit 58 obtains the intensity difference ΔA by a calculation formula of ΔA=Lv1−Lv2. The value of the intensity difference ΔA becomes a large value when the metal powder 32 is applied normally to the manufactured surface 32b by the passage of the squeegee 16c, and becomes a small value when the metal powder is not applied normally. The case where the metal powder 32 is applied normally refers to a case where new metal powder 32 is applied with a thickness corresponding to ΔZ on the manufactured surface 32b. On the other hand, the case where the metal powder 32 is not applied normally refers to a case where no new metal powder 32 is applied onto the manufactured surface 32b, or a case where the application thickness is insufficient as compared with ΔZ even if the new metal powder is applied.

The intensity difference ΔA described above is calculated for each pixel constituting the image of the manufactured surface 32b photographed by the camera 42 during the movement of the squeegee 16c. Therefore, when the image of the manufactured surface 32b includes a total of M pixels, the determination unit 58 calculates a total of M intensity differences ΔA.

Next, the image processing unit 56 determines whether the squeegee 16c has completely passed through the manufactured surface 32b (step S105). When the squeegee 16c completely passes through the manufactured surface 32b, the squeegee 16c is hidden behind the mask portion 30b of the electron shield 30 and cannot be seen. Therefore, the image processing unit 56 determines that the squeegee 16c has completely passed through the manufactured surface 32b when the squeegee 16c is no longer displayed in the image taken in from the camera 42. When it is determined as NO in step S105, the process returns to step S104 described above. Thus, the calculation of the intensity difference ΔA is continued until the squeegee 16c completely passes through the manufactured surface 32b. Therefore, the value of the intensity difference ΔA is obtained for all the pixels constituting the image of the manufactured surface 32b.

On the other hand, when it is determined as YES in step S105, the process proceeds to step S106. In step S106, the image processing unit 56 finishes taking in the image from the camera 42.

Thereafter, when the movement of the squeegee 16c to the movement end point is detected by, for example, an end point detection sensor (not shown), the movement of the squeegee 16c is ended according to a control command from the control unit 50 based on the detection result (step S107). The movement end point of the squeegee 16c is set at the right end of the build table 18 shown in FIG. 1. Although not shown in the flowchart of FIG. 4, the squeegee 16c moves to the movement end point and then returns to the movement start point while leveling the upper surface of the powder layer 32a. That is, the squeegee 16c reciprocates on the build table 18.

Next, the determination unit 58 compares the magnitude relationship between the intensity difference ΔA calculated as described above and a preset first threshold SH1 for each pixel, and calculates a total number B of pixels satisfying the condition of ΔA≤SH1 based on the comparison result (step S108). The first threshold SH1 is a threshold set in the determination unit 58 in order to discriminate between a pixel to which the metal powder 32 has been applied normally and a pixel to which the metal powder 32 has not been applied normally. The pixel satisfying the condition of ΔA≤SH1 is a pixel for which it is determined that the metal powder 32 has not been applied normally, that is, a pixel suspected of having powder application failure of the metal powder 32 (hereinafter, also referred to as an "abnormal pixel"). In addition, a pixel satisfying the condition of ΔA>SH1 is a pixel for which it is determined that the metal powder 32 has been applied normally (hereinafter, also referred to as a "normal pixel").

Next, the determination unit 58 compares the magnitude relationship between the total number B of abnormal pixels calculated as described above and a preset second threshold SH2 (step S109). The second threshold SH2 is a threshold set to determine whether powder application failure of a level that may lead to a defect of the manufactured object has occurred in the metal powder 32 (powder layer 32a) newly applied on the build plate 22 by the movement of the squeegee 16c. The defect of the manufactured object caused by the powder application failure may be a dimensional accuracy error exceeding an allowable value. The second threshold SH2 is set to a value sufficiently smaller than M when the image of the manufactured surface 32b photographed by the camera 42 includes a total of M pixels. The second threshold SH2 can be optionally set or changed according to the level of the defect allowed in the manufactured object.

In step S109, when the total number B of abnormal pixels exceeds the second threshold SH2, the determination unit 58 determines that powder application failure of the metal powder 32 has occurred (determined as YES in step S109). In addition, in step S109, when the total number B of abnormal pixels is equal to or less than the second threshold SH2, the determination unit 58 determines that powder application failure of the metal powder 32 has not occurred (determined as NO in step S109).

When it is determined as YES in step S109, the process proceeds to step S9 in FIG. 3. In this case, the control unit 50 performs the first preheating step S9 and the powder application step S11 again for the current layer manufacturing. When it is determined as NO in step S109, the process proceeds to step S12 in FIG. 3. In this case, the control unit 50 performs the second preheating step S13 and the sintering step S14 without performing the first preheating step S9 and the powder application step S11 again for the current layer manufacturing.

The flowchart shown in FIG. 4 can be applied not only to step S11 in FIG. 3 but also to step S4. In addition, in the case of performing the powder application step again, the control unit 50 may control the powder application device 16 so as to increase the application amount of the metal powder 32 by the powder application device 16 (in other words, the dropping amount of the metal powder 32 by the powder dropping device 16b) more than that before the powder application step is performed again. As a result, it is possible to suppress the occurrence of powder application failure due to the shortage of the application amount of the metal powder 32 in the powder application step after it is performed again.

As described above, the three-dimensional PBF-AM apparatus 10 according to the first embodiment of the present invention includes the determination unit 58 that determines whether powder application failure of the metal powder 32 has occurred using the image photographed by the camera 42 while the squeegee 16c is moving on the manufactured surface 32b. As a result, the occurrence of powder application failure of the metal powder 32 can be automatically detected. When the determination unit 58 determines that powder application failure has occurred in the powder application step, manufacturing work after the occurrence of powder application failure can be suitably continued by operating the three-dimensional PBF-AM apparatus 10 in a mode different from the case where powder application failure has not occurred. As a result, deterioration of the dimensional accuracy of the manufactured object due to powder application failure can be suppressed.

Furthermore, in the first embodiment of the present invention, the determination unit 58 obtains the difference (ΔA) between the predicted intensity Lv1 immediately after the squeegee 16c passes and the measured intensity Lv2 immediately after the squeegee 16c passes, which is predicted from the temporal change in the intensity of the image before the squeegee 16c passes, using the image photographed by the camera 42 while the squeegee 16c passes through the manufactured surface 32b, and determines whether powder application failure of the metal powder 32 has occurred based on the obtained difference. As a result, in parallel with the movement of the squeegee 16c in the powder application step, the data (ΔA) for determining the presence or absence of powder application failure can be acquired in real time. Therefore, the occurrence of powder application failure can be detected early.

In the first embodiment of the present invention, when the determination unit 58 determines that powder application failure has occurred, the control unit 50 performs the first preheating step and the powder application step again before performing the second preheating step and the sintering step for the current layer manufacturing. As a result, even when powder application failure of the metal powder 32 occurs in the first powder application step, the laminated state of the powder layer 32a can be restored to a favorable state by performing the first preheating step and the powder application step again thereafter. Therefore, it is possible to suppress the occurrence of defects such as dimensional accuracy deviation in the manufactured object. In addition, generation of voids due to insufficient melting can be suppressed.

Further, according to the first embodiment of the present invention, it is possible to suppress contamination or breakage in the vacuum chamber 12. The reason is as follows.

When the thickness of the powder layer 32a becomes partially or entirely thinner than ΔZ due to the occurrence of powder application failure in the powder application step, if the manufacturing work is continued as usual without taking any measures, the thickness of the powder layer 32a may become partially or entirely thicker than ΔZ when the powder application step is performed for the next layer. In such a case, the amount of heat stored in the powder layer 32a as the previous layer in the first preheating step (after-heating step) may not be spread to the entire powder layer 32a forming the next layer, and the calcination may not be sufficiently promoted. As a result, in the second preheating step (powder-heat step), since the metal powder 32 is irradiated with the electron beam 15 while the powder particles of the metal powder 32 have high electric resistance, the neutralization of the charges of the powder is not promoted, and there is a high possibility that a phenomenon in which the powder is scattered by repulsion between the charges, that is, smoke occurs. When smoke occurs, powder particles scattered in the vacuum chamber 12 are scattered in a wide range, which may contaminate the inside of the vacuum chamber 12 or damage components arranged in the vacuum chamber 12.

On the other hand, in the first embodiment of the present invention, even if the thickness of the powder layer 32a is partially or entirely reduced due to occurrence of powder application failure, the metal powder 32 can be spread so that the thickness of the powder layer 32a is entirely uniform (ΔZ) by performing the first preheating step and the powder application step again. Therefore, the calcination of the next layer can be sufficiently promoted, and the occurrence of smoke in the second preheating step of the next layer can be suppressed. Therefore, contamination or breakage in the vacuum chamber 12 can be suppressed.

In the first embodiment, the total number B of abnormal pixels is calculated, and it is determined that powder application failure of the metal powder 32 has occurred when the calculated total number B exceeds the second threshold SH2. However, the present invention is not limited thereto, and the total area of abnormal pixels may be calculated instead of the total number B of abnormalities. Then, when the calculated total area of the abnormal pixels exceeds the second threshold, it may be determined that powder application failure of the metal powder 32 has occurred.

Second Embodiment

Figure 7:
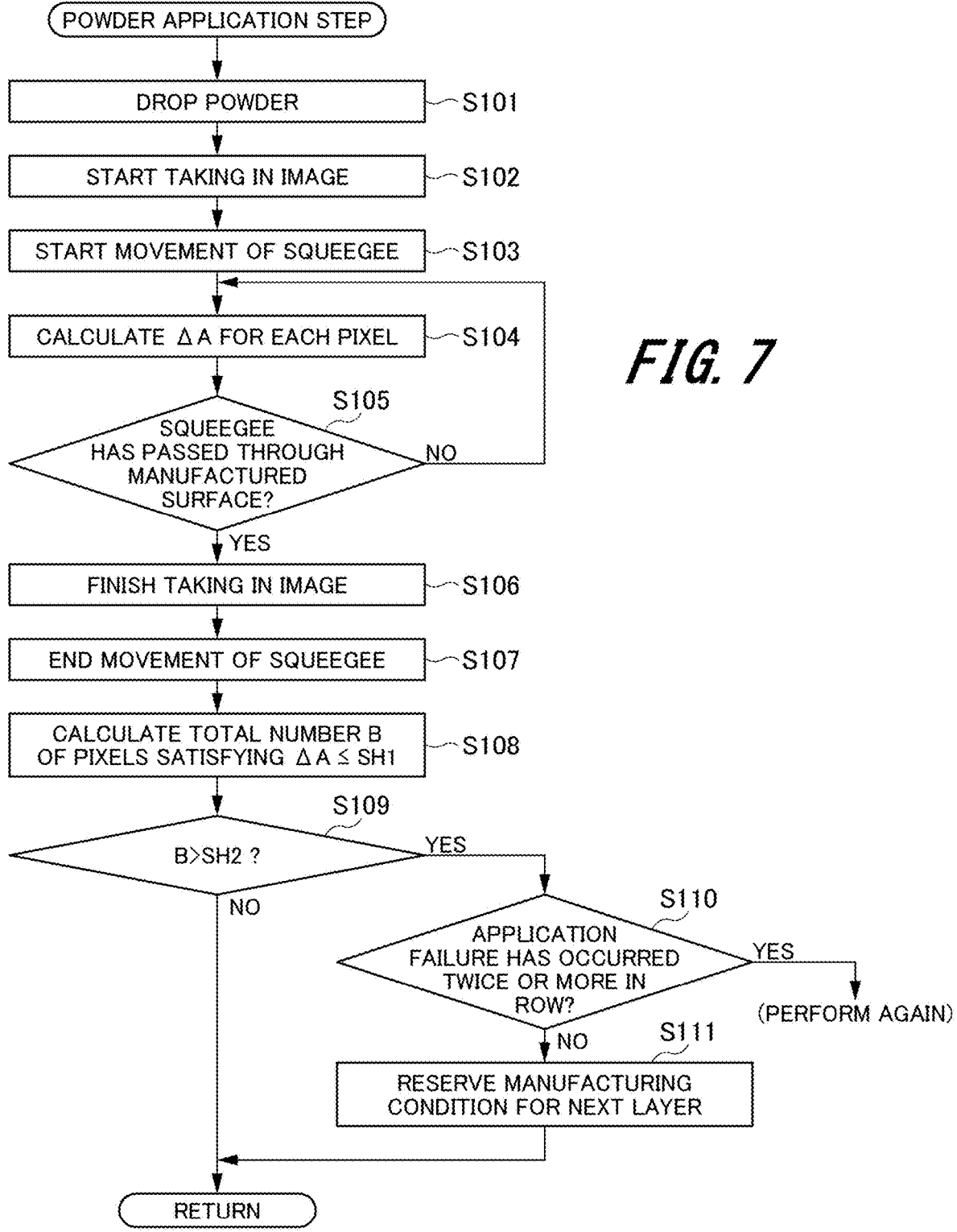
FIG. 7 is a flowchart showing a processing procedure of a powder application step according to a second embodiment of the present invention.

FIG. 7 is a flowchart showing a processing procedure of the powder application step according to a second embodiment of the present invention.

As shown in FIG. 7, in the second embodiment of the present invention, as compared with the processing procedure of the above-described first embodiment (see FIG. 4), the flow of processing from step S101 to step S109 is the same, but the flow of processing after it is determined as YES in step S109 is different.

Specifically, when it is determined as YES in step S109, the process proceeds to step S110. In step S110, the control unit 50 confirms whether the determination unit 58 has continuously determined that powder application failure has occurred twice or more in a row in step S109. When it is determined as YES in step S110, the control unit 50 proceeds to step S9 in FIG. 3. In this case, the control unit 50 performs the first preheating step S9 and the powder application step S11 again for the current layer manufacturing.

On the other hand, when it is determined as NO in step S110, that is, when the number of times that the determination unit 58 determines that powder application failure has occurred is 1 (first time), the control unit 50 proceeds to step S111.

Next, in step S111, the control unit 50 reserves the condition to be applied to the next layer manufacturing, and then returns to step S12 in FIG. 3. The condition to be applied to the next layer manufacturing is reserved with a content different from a condition to be applied when there is no powder scattering (hereinafter, also referred to as a "normal condition"). Specifically, the control unit 50 performs a reservation for extending the execution time of the first preheating step S9, a reservation for increasing the application amount of the powder material in the powder application step S11, and a reservation for enhancing the energy applied to the powder layer 32a in the sintering step S14. The execution time of the first preheating step S9 is a time from the start to the end of the irradiation (scanning) of the electron beam 15 in the first preheating step S9. When the execution time of the first preheating step S9 is extended, the irradiation time of the electron beam 15 becomes longer as compared with the case where the normal condition is applied, and the temperature of the powder layer 32a becomes higher accordingly. Therefore, instead of the reservation for extending the execution time of the first preheating step S9, a reservation for setting the heating target temperature of the first preheating step S9 higher than the normal condition may be made. The application amount of the powder material is defined by the dropping amount of the metal powder 32 dropped from the powder dropping device 16b in the powder application step S11. Therefore, the control unit 50 makes a reservation for increasing the dropping amount of the metal powder 32 by the powder dropping device 16b more than under the normal condition.

As a method for enhancing the energy applied to the powder layer 32a in the present sintering step S14, for example, the following methods (a), (b), and (c) can be considered.

(a) The beam current of the electron beam 15 with which the powder layer 32a is irradiated in the sintering step S14 is made larger than that under the normal condition.

(b) The scanning speed of the electron beam 15 with which the powder layer 32a is irradiated in the sintering step S14 is made lower than that under the normal condition.

(c) The interval between the scanning lines is made narrower (denser) than in the normal condition.

In step S111, the control unit 50 may perform all of the reservation for extending the execution time of the first preheating step S9, the reservation for increasing the heating target temperature of the first preheating step S9, the reservation for increasing the application amount of the powder material in the powder application step S11, and the reservation for enhancing the energy applied to the powder layer 32a in the sintering step S14, or may perform any three, any two, or any one of the reservations. In addition, the condition reserved in step S111 may be applied not only to the next layer but also continuously applied to two or more layers including the next layer.

As described above, when returning to step S12 after reserving the condition to be applied to the next layer manufacturing in step S111, the control unit 50 performs the second preheating step S13 and the sintering step S14 without performing the first preheating step S9 and the powder application step S11 again for the current layer manufacturing. Then, when the processes of steps S8 to S14 are performed on the next layer, the control unit 50 applies the execution time and/or the heating target temperature reserved in step S111 described above in the first preheating step S9, applies the application amount of the powder material (metal powder 32) reserved in step S111 described above in the powder application step S11, and applies the energy amount reserved in step S111 described above in the sintering step S109.

Although not shown, when the number of times of YES determination in step S109 for the same layer reaches a predetermined number of times N (N is an integer larger than 2), there is a possibility that an abnormality that cannot be recovered even if the powder application step is performed again has occurred in the three-dimensional PBF-AM apparatus 10, for example, the remaining amount of the powder in the hopper 16a has become empty. In that case, it is preferable to stop the operation of the three-dimensional PBF-AM apparatus 10 for device maintenance. The same applies to the first embodiment described above.

As described above, in the second embodiment of the present invention, when the determination unit 58 determines that powder application failure of the powder material has occurred, the control unit 50 reserves the condition to be applied to the next layer manufacturing with a content different from the condition to be applied when powder application failure of the powder material has not occurred, and then performs the second preheating step S13 and the sintering step S14 for the current layer manufacturing. Then, for the next layer manufacturing, the control unit 50 performs the plate lowering step S8, the first preheating step S9, the powder application step S11, the second preheating step S13, and the sintering step S14 according to the reserved condition.

Thus, the manufacturing throughput can be improved as compared with the first embodiment described above. The reason is as follows.

First, in the first embodiment described above, when the determination unit 58 determines that powder application failure of the powder material has occurred, the first preheating step S9 and the powder application step S11 are performed again for the current layer manufacturing. Performing the step as described above leads to a decrease in manufacturing throughput while an effect of suppressing the occurrence of defects by recovering the laminated state of the powder layer 32a is obtained. On the other hand, in the second embodiment, when the determination unit 58 determines that powder application failure of the powder material has occurred, the second preheating step S13 and the sintering step S14 are performed for the current layer manufacturing after the condition to be applied to the next layer manufacturing is reserved. Therefore, it is possible to suppress a decrease in manufacturing throughput caused when the steps are performed again.

Figure 8A:
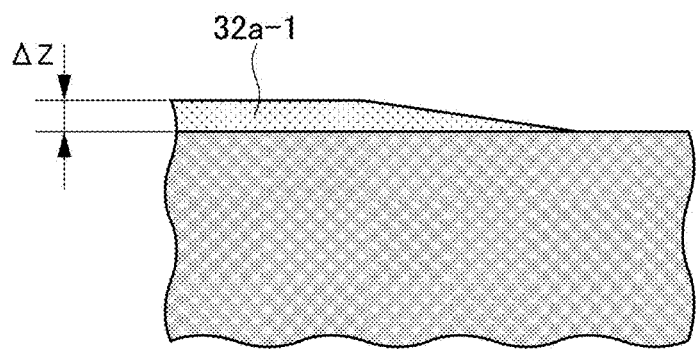
FIGS. 8A and 8B are schematic diagrams showing a change in thickness of a powder layer accompanying powder application failure.
Figure 8B:
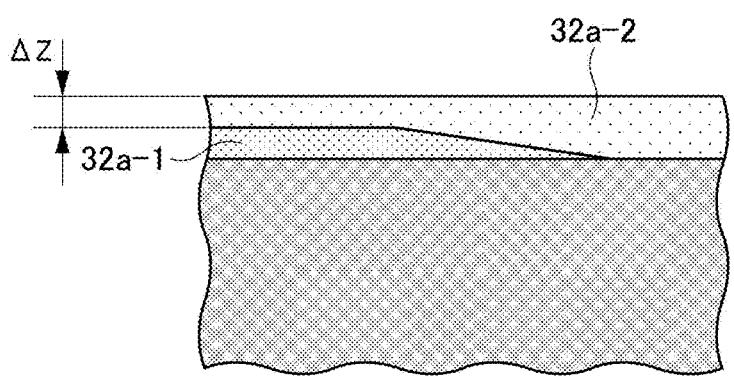

Furthermore, by carrying out the next layer manufacturing according to the reserved condition, it is possible to appropriately cope with the change in the thickness of the powder layer 32a accompanying the powder application failure. More specifically, when powder application failure occurs in the powder application step S11 in the current layer manufacturing, the thickness of the powder layer 32a becomes partially or entirely thin. Therefore, when the powder application step is performed for the next layer manufacturing, the metal powder 32 is applied thickly so as to compensate for the thinness of the previous layer. For example, in a case where the thickness of a powder layer 32a-1 is partially thinner than $\Delta Z$ in the current layer manufacturing as shown in FIG. 8A, when a powder layer 32a-2 being the next layer is formed on the powder layer 32a, the thickness of a manufactured surface 32b-2 is partially thicker than $\Delta Z$ as shown in FIG. 8B. In such a case, when manufacturing is performed with the same content as the normal condition, insufficient heating occurs in the first preheating step S9, insufficient application amount occurs in the powder application step S11, or energy shortage occurs in the sintering step S14. In the second embodiment, as the reservation for the condition to be applied to the next layer manufacturing, a reservation for extending the execution time of the first preheating step S9, a reservation for increasing the application amount of the powder material in the powder application step S11, and a reservation for enhancing the energy applied to the powder layer 32a in the sintering step S14 are performed. Therefore, insufficient heating in the first preheating step S9, insufficient application in the powder application step S11, and insufficient energy in the sintering step S14 can be avoided. Therefore, it is possible to appropriately cope with the change in the thickness of the powder layer 32a accompanying the powder application failure. Furthermore, the laminating of the manufactured object can be restored to a favorable state without performing the step again.

Third Embodiment

Figure 9:
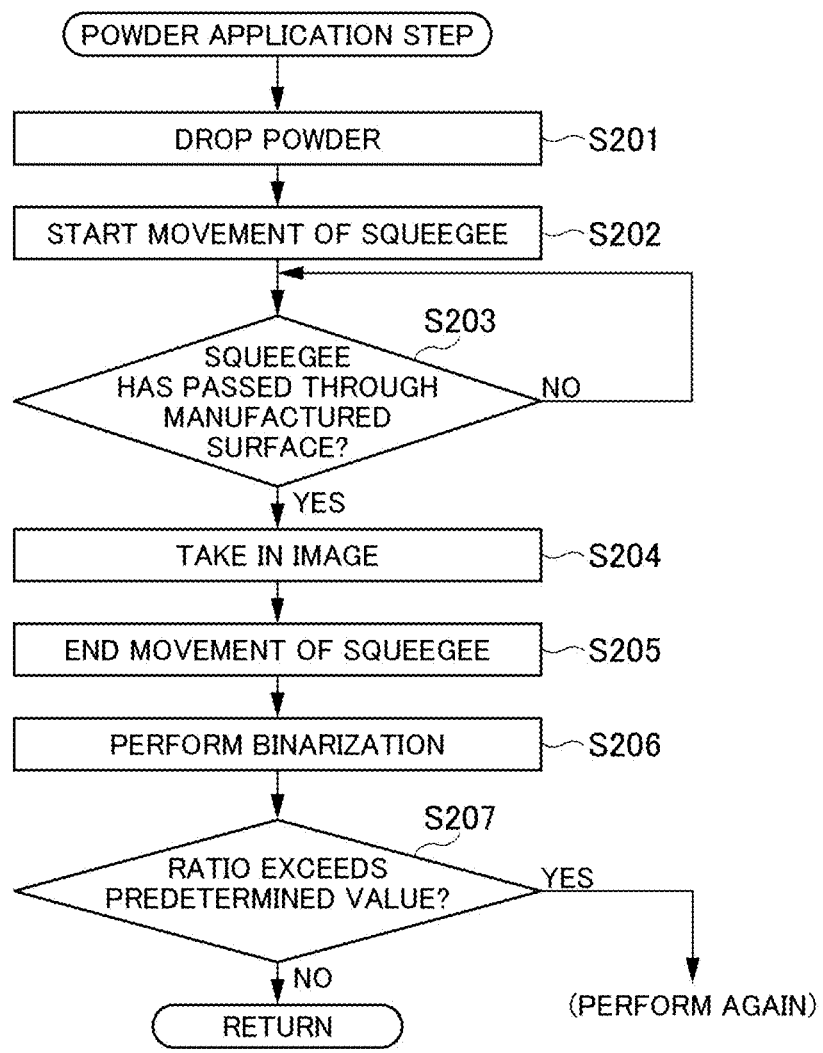
FIG. 9 is a flowchart showing a processing procedure of a powder application step according to a third embodiment of the present invention.

FIG. 9 is a flowchart showing a processing procedure of the powder application step according to a third embodiment of the present invention. The processing shown in this flowchart is performed under the control of the control unit 50, and applied to step S11 and/or step S4 in FIG. 3.

First, under the arrangement state shown in FIG. 1, the powder dropping device 16b drops the metal powder 32 onto the build table 18 according to a control command from the control unit 50 (step S201). Step S201 is performed similarly to step S101 described above.

Next, the squeegee 16c starts moving from the left end to the right end on the build table 18 shown in FIG. 1 according to a control command from the control unit 50 (step S202). Step S202 is performed similarly to step S103 described above.

Next, the image processing unit 56 determines whether the squeegee 16c has completely passed through the manufactured surface 32b (step S203). Step S203 is performed similarly to step S105 described above. When it is determined as NO in step S203, the process waits until the squeegee 16c completely passes through the manufactured surface 32b, and when it is determined as YES in step S203, the process proceeds to step S204. In step S204, the image processing unit 56 takes in an image from the camera 42. As a result, an image showing the state of the powder layer 32a immediately after the squeegee 16c passes through the manufactured surface 32b is obtained. The reason why the camera image immediately after the squeegee 16c passes through the manufactured surface 32b is used will be described later.

Thereafter, when the movement of the squeegee 16c to the movement end point is detected by, for example, an end point detection sensor (not shown), the movement of the squeegee 16c is ended according to a control command from the control unit 50 based on the detection result (step S205). Step S205 is performed similarly to step S107 described above. The squeegee 16c moves to the movement end point and then returns to the movement start point while leveling the upper surface of the powder layer 32a.

Next, the determination unit 58 determines whether powder application failure of the metal powder 32 has occurred by the following processing using the image taken in by the image processing unit 56 in step S204 described above.

First, the determination unit 58 binarizes the image taken in by the image processing unit 56 (step S206). The image is binarized as a pretreatment for the determination unit 58 to determine whether powder application failure of the metal powder 32 has occurred. Details will be described below.

When the metal powder 32 of the next layer is spread on the powder layer 32a that has been preheated, the temperature of the manufactured surface 32b decreases. Therefore, the image of the manufactured surface 32b photographed by the camera 42 is slightly darker than before the metal powder 32 of the next layer is spread. However, in a case where the metal powder 32 of the next layer is not applied normally and the thickness of the powder layer 32a is partially thinner than ΔZ, the image of the portion is brighter than that in a case where the metal powder is applied normally. Therefore, the image of the manufactured surface 32b after the application of the metal powder 32 is finished by the squeegee 16c is taken from the camera 42 and binarized, so that the intensity distribution of the image can be grasped by the black-and-white image. The black-and-white image is an image including a combination of a white region and a black region. In the image of the manufactured surface 32b of the powder layer 32a, a portion where the metal powder 32 is applied normally is a dark image, and a portion where the metal powder 32 is not applied normally is displayed as a bright image.

Therefore, the determination unit 58 determines whether powder application failure of the metal powder 32 has occurred based on the intensity distribution of the image grasped from the black-and-white image after binarization. Specifically, in step S207, when the ratio of the white region in the black-and-white image after binarization exceeds the predetermined value, the determination unit 58 determines that powder application failure has occurred (determined as YES in step S207), and otherwise (determined as NO in step S207), the determination unit 58 determines that powder application failure has not occurred. When it is determined as YES in step S207, the process proceeds to step S9 in FIG. 3, and when it is determined as NO in step S207, the process proceeds to step S12 in FIG. 3.

Here, the reason why the camera image immediately after the squeegee 16c passes through the manufactured surface 32b is used will be described.

First, when the squeegee 16c passes through the manufactured surface 32b while spreading the metal powder 32, in the portion where the metal powder 32 is applied normally, the manufactured surface 32b of the lower layer (previous layer) as a base is covered with the newly applied metal powder 32, and thus the intensity of the image of the manufactured surface 32b decreases. However, the intensity of the image of the manufactured surface 32b gradually increases with the lapse of time thereafter. This is because the temperature of the newly applied metal powder 32 is raised by the heat transferred from the manufactured surface 32b being the base, and the image of the manufactured surface 32b gradually becomes brighter. When the image of the manufactured surface 32b becomes brighter than a certain level with the lapse of time, a clear difference does not appear in the intensity distribution between the case where the metal powder 32 is applied normally and the case where the metal powder 32 is not applied normally. On the other hand, in the camera image immediately after the squeegee 16c passes through the manufactured surface 32b, a clear difference appears in the intensity distribution between the case where the metal powder 32 is applied normally and the case where the metal powder 32 is not applied normally. Therefore, in order to accurately determine the presence or absence of the powder application failure, it is necessary to use the camera image immediately after the squeegee 16c passes through the manufactured surface 32b. The time immediately after the squeegee 16c passes through the manufactured surface 32b refers to a range of time in which a difference occurs in the intensity distribution of the image to the extent that the case where powder application failure of the metal powder 32 occurs and the case where powder application failure does not occur can be distinguished.

As described above, the three-dimensional PBF-AM apparatus 10 according to the third embodiment of the present invention includes the determination unit 58 that determines whether powder application failure of the metal powder 32 has occurred using the image photographed by the camera 42 immediately after the squeegee 16c passes through the manufactured surface 32b. As a result, effects similar to those of the first embodiment can be obtained.

In addition, in the third embodiment of the present invention, when the determination unit 58 detects the occurrence of powder application failure (when it is determined as YES in step S207), the process proceeds to step S110 shown in FIG. 7, whereby effects similar to those of the second embodiment can be obtained.

The method of binarizing the image photographed by the camera 42 immediately after the squeegee 16c passes through the manufactured surface 32b and determining the presence or absence of powder application failure of the metal powder 32 based on the black-and-white image obtained by the binarizing is not limited to the above method, and various modifications as described below can be made, for example.

(First Modification)

Figure 10A:
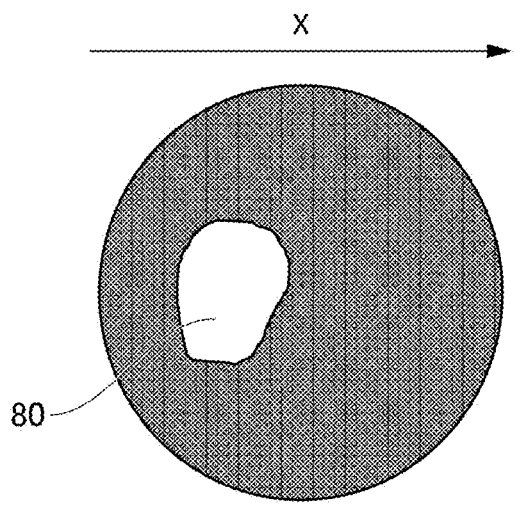
FIGS. 10A to 10B are schematic diagrams showing an example of a black-and-white image obtained by binarizing an image photographed by a camera.

First, when the metal powder 32 dropped by the powder dropping device 16b is spread by the movement of the squeegee 16c, the metal powder 32 may be heated at a relatively early stage after the powder spreading and start to be red-heated depending on the set temperature of the preheating step performed before the spread or the type of the metal powder 32 to be used. Therefore, for example, when the squeegee 16c is moved from the left to the right in FIG. 1, the metal powder 32 starts to be red-heated first from the left side close to the movement start point of the squeegee 16c. Therefore, in the black-and-white image obtained by binarizing the photographed image of the camera 42, as shown in FIG. 10A, there is a possibility that a portion having high intensity, that is, a white region 80 widely appears on the upstream side in the moving direction of the squeegee 16c (the left side in FIG. 10 A) due to red heat of the metal powder 32. Since the white region 80 appears even when powder application failure does not occur, it is preferable to subtract the portion of the white region 80 from the black-and-white image after binarization when the presence or absence of the occurrence of powder application failure is actually determined.

Figure 10B:
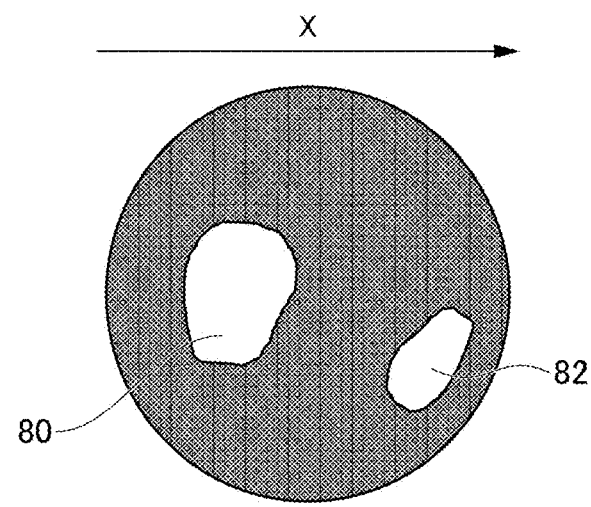
Figure 11A:
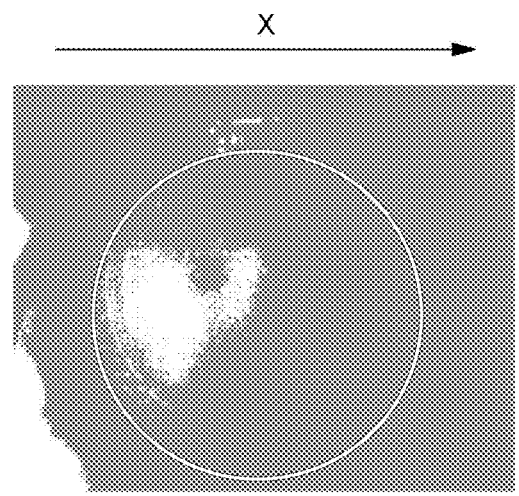
FIGS. 11A and 11B are diagrams showing a first specific example of a black-and-white image obtained by binarizing an image photographed by a camera.
Figure 11B:
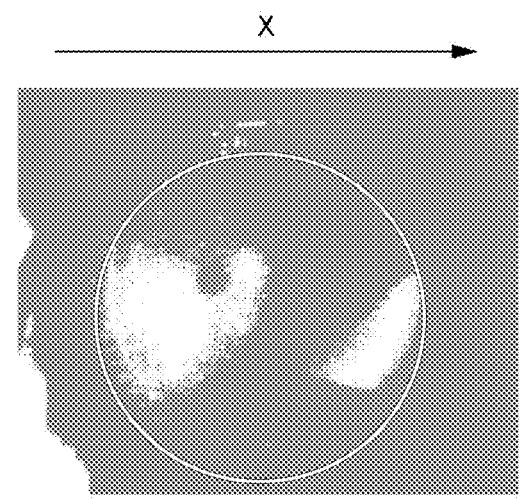

Subtraction of the portion of the white region 80 substantially means that the white region 80 is regarded as a black region. Which part of the white region 80 to be subtracted is to be specified in advance by an experiment or the like. As a result, for example, as shown in FIG. 10B, when a white region 82 accompanying the powder application failure and the above-described white region 80 are present in the black-and-white image after binarization, it is possible to exclude the influence of the white region 80, extract only the white region 82, and determine the presence or absence of the occurrence of powder application failure based on the ratio of the white region 82. Further, in the black-and-white image shown in FIG. 10B, when the white region 80 appearing in the image on the upstream side in the squeegee movement direction is ignored and the ratio of the white region 82 appearing in the image on the downstream side in the squeegee movement direction exceeds a predetermined value, it may be determined that powder application failure of the metal powder 32 has occurred. For reference, FIG. 11A is a black-and-white image obtained by binarizing a camera image in a case where powder application failure does not occur, and FIG. 11B is a black-and-white image obtained by binarizing a camera image in a case where powder application failure occurs. In FIGS. 11A and 11B, the outer shape of the manufactured surface 32b is indicated by a white circle for convenience of drawing notation. The same applies to FIGS. 13A to 13C described later.

(Second Modification)

Figure 12:
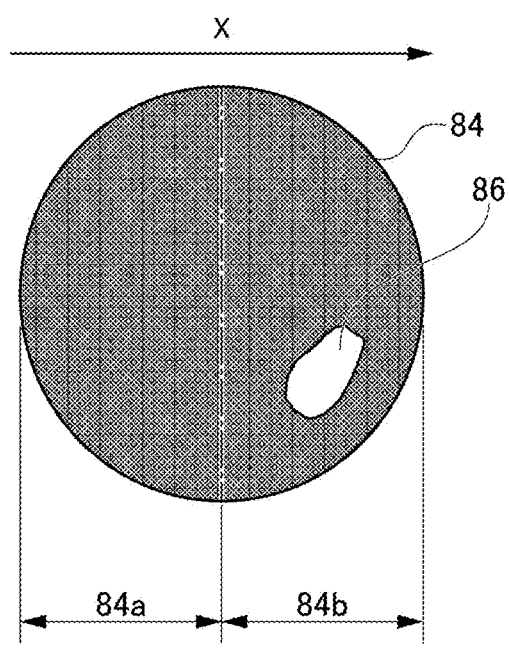
FIG. 12 is a schematic diagram showing a state in which a black-and-white image obtained by binarizing an image photographed by a camera is divided into an image on an upstream side in a squeegee movement direction and an image on a downstream side in the squeegee movement direction.
Figure 13A:
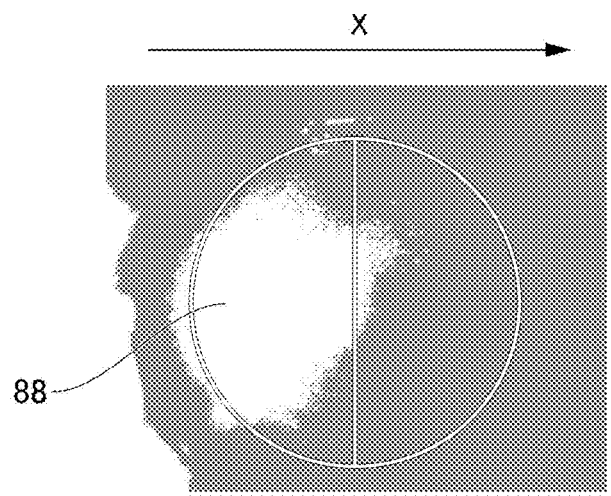
FIGS. 13A to 13C are diagrams showing a second specific example of a black-and-white image obtained by binarizing an image photographed by a camera.
Figure 13B:
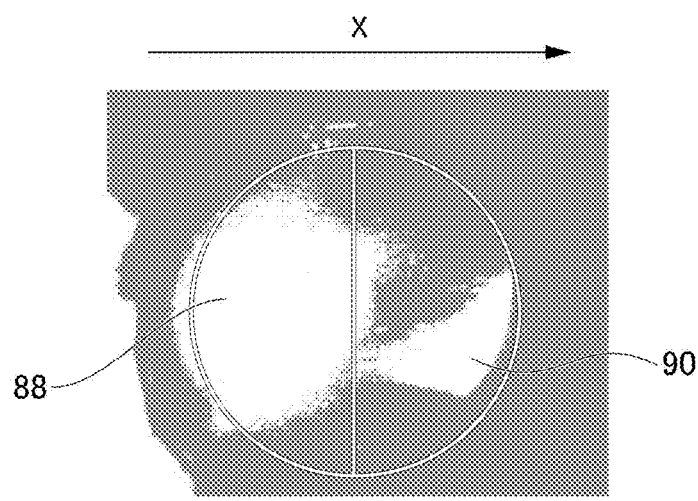
Figure 13C:
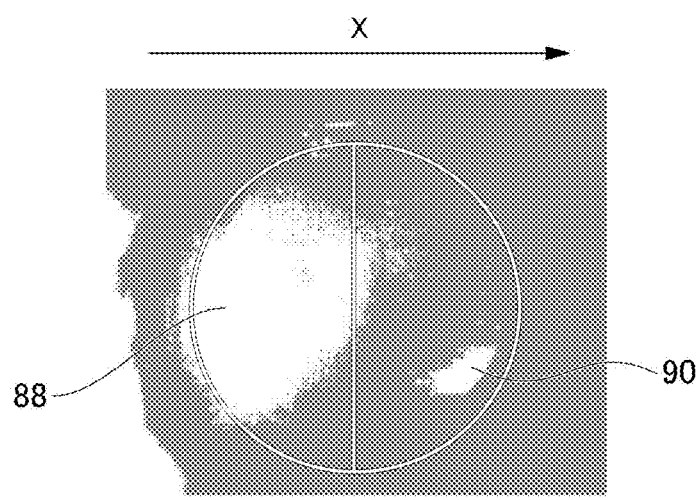

Powder application failure of the metal powder 32 occurs mainly on the downstream side in the moving direction of the squeegee 16c. Therefore, in the black-and-white image obtained by binarizing the image photographed by the camera 42, the determination unit 58 may determine that powder application failure of the metal powder 32 has occurred when the white region appearing in the image on the downstream side in the squeegee movement direction is wider than the white region appearing in the image on the upstream side in the squeegee movement direction. Specifically, as shown in FIG. 12, in the X direction which is the squeegee movement direction, a black-and-white image 84 after binarization is divided into an image 84a on the upstream side in the squeegee movement direction and an image 84b on the downstream side in the squeegee movement direction with the center position in the X direction as a boundary. Then, when a white region 86 appearing in the image 84b on the downstream side in the squeegee movement direction is wider than the white region (not shown) appearing in the image 84a on the upstream side in the squeegee movement direction, the determination unit 58 determines that powder application failure of the metal powder 32 has occurred. For reference, FIG. 13A is a black-and-white image obtained by binarizing a camera image in a case where powder application failure does not occur, and FIGS. 13B and 13C are both black-and-white images obtained by binarizing a camera image in a case where powder application failure occurs. As can be seen from FIG. 13A, even when powder application failure does not occur, a white region 88 widely appears in the image portion located on the upstream side in the squeegee movement direction. This is because the metal powder 32 starts to be red-heated at a relatively early stage after the powder spreading as described above. Therefore, also in this case, the white region 88 appearing in the image on the upstream side in the squeegee movement direction may be subtracted or ignored, the widths of the white region appearing in the image on the downstream side in the squeegee movement direction and the white region appearing in the image on the upstream side in the squeegee movement direction may be compared, and the presence or absence of powder application failure may be determined based on the comparison result. Furthermore, the position to be divided into the image 84a and the image 84b is not limited to the center position in the X direction, and may be a position deviated slightly upstream or downstream of the center position in the X direction.

Furthermore, when the manufactured surface 32b is irradiated with light from the illuminating light source, in a case where a region that looks always bright from the camera 42 (in other words, an image portion that always becomes a white region by binarization) due to the positional relationship between the illuminating light source and the camera 42, or the like is present, it is possible to accurately determine the presence or absence of the occurrence of powder application failure by subtracting or ignoring the region.

In the third embodiment, whether powder application failure of the metal powder 32 has occurred is determined based on the intensity distribution indicated by the black-and-white image including the white region and the black region, that is, the two-gradation image obtained by binarizing the image photographed by the camera 42, but the present invention is not limited thereto. For example, the image photographed by the camera 42 may be converted into a gray scale multi-gradation image, and whether powder application failure of the metal powder 32 has occurred may be determined based on the intensity distribution represented by the multi-gradation image.

In the third embodiment, whether powder application failure of the metal powder 32 has occurred is determined based on the intensity distribution of the image photographed by the camera 42 immediately after the squeegee 16c passes through the manufactured surface 32b. However, the present invention is not limited thereto, and the red saturation distribution of the image may be adopted instead of the intensity distribution of the image. The reason is as follows.

First, when the powder layer 32a is irradiated with the electron beam 15 in the preheating step (first preheating step) performed before the powder application step, the manufactured surface 32b of the powder layer 32a is red-heated and becomes red. Next, when the metal powder 32 is applied in the powder application step onto the manufactured surface 32b in the red-heated state, the reddishness of the portion to which the metal powder 32 is applied normally is weakened and the blackish hue is obtained, that is, the saturation is lowered, and in the portion to which the metal powder 32 is not applied normally, the color of the manufactured surface 32b of the base (red-heated state) is raised and the red hue is obtained, that is, the saturation is increased. Therefore, even when the saturation distribution is adopted instead of the intensity distribution, the presence or absence of the occurrence of powder application failure can be determined.

What is claimed is:

1. A three-dimensional powder bed fusion additive manufacturing apparatus, comprising:
    a build plate;
    a plate moving device that moves the build plate in an up-down direction;
    a powder application device that applies a powder material onto the build plate to form a powder layer, the powder application device comprising a squeegee that moves on the build plate to spread the powder material;
    a beam irradiation device that irradiates the build plate or the powder layer with a beam;
    a control unit configured or programmed to: control the plate moving device, the powder application device, and the beam irradiation device to form a manufactured object for one layer through a powder application step, a powder heating step, a sintering step, and an after-heating step, and to form a three-dimensional manufactured object by laminating the manufactured object for one layer;
    a camera that photographs a manufactured surface of the powder layer; and
    a determination unit configured or programmed to determine whether powder application failure of the powder material has occurred using images photographed by the camera while and immediately after the squeegee passes through the manufactured surface,
    wherein the determination unit uses an image photographed by the camera while the squeegee is passing through the manufactured surface to obtain a difference between a predicted feature value immediately after the squeegee passes and a feature value of an image immediately after the squeegee passes, the predicted feature value being predicted from a temporal change in a feature value of an image before the squeegee passes, and determines whether powder application failure of the powder material has occurred based on the obtained difference,
    wherein the feature value of the image is at least one of intensity and saturation of the image.

2. The three-dimensional powder bed fusion additive manufacturing apparatus according to claim 1,
    wherein the determination unit is further configured or programmed to obtain an approximate expression indicating a temporal change in a feature value of an image before the squeegee passes based on the temporal change in the feature value, and determines the predicted feature value according to the approximate expression.

3. The three-dimensional powder bed fusion additive manufacturing apparatus according to claim 1,
    wherein the determination unit is further configured or programmed to calculate a total number or a total area of pixels in which a difference between a predicted feature value immediately after the squeegee passes and a feature value of an image immediately after the squeegee passes is a first threshold or less, and determines that powder application failure of the powder material has occurred when the total number or the total area of the pixels exceeds a second threshold.

4. The three-dimensional powder bed fusion additive manufacturing apparatus according to claim 1,
    wherein, when the determination unit determines that the powder application failure has occurred, the control unit is configured or programmed to perform the after-heating step and the powder application step again for current layer manufacturing.

5. The three-dimensional powder bed fusion additive manufacturing apparatus according to claim 4,
    wherein the control unit is configured or programmed to control the powder application device so as to increase an application amount of the powder material by the powder application device more than that before the powder application step is performed again when the powder application step is performed again.

6. The three-dimensional powder bed fusion additive manufacturing apparatus according to claim 1,
    wherein, when the determination unit determines that powder application failure of the powder material has occurred, the control unit is configured or programmed to reserve a condition to be applied to next layer manufacturing with a content different from a condition to be applied when powder application failure of the powder material has not occurred, then perform the powder heating step and the sintering step for current layer manufacturing, and perform the after-heating step, the powder application step, the powder heating step, and the sintering step for the next layer manufacturing according to the reserved condition.

7. The three-dimensional powder bed fusion additive manufacturing apparatus according to claim 6,
    wherein, when the determination unit determines that the powder application failure has occurred twice or more in a row, the control unit is configured or programmed to perform the after-heating step and the powder application step again for current layer manufacturing.

8. The three-dimensional powder bed fusion additive manufacturing apparatus according to claim 6,
    wherein the reservation of the condition applied to the manufacturing for next layer manufacturing is at least one of a reservation for extending an execution time of the after-heating step, a reservation for increasing a heating target temperature of the after-heating step, a reservation for increasing an application amount of the powder material in the powder application step, and a reservation for enhancing energy applied to the powder layer in the sintering step.

9. A three-dimensional powder bed fusion additive manufacturing method using a three-dimensional powder bed fusion additive manufacturing apparatus, comprising:
    a build plate;
    a plate moving device that moves the build plate in an up-down direction;
    a powder application device that applies a powder material onto the build plate to form a powder layer, the powder application device comprising a squeegee that moves on the build plate to spread the powder material;
    a beam irradiation device that irradiates the build plate or the powder layer with a beam;
    a control unit configured or programmed to: control the plate moving device, the powder application device, and the beam irradiation device to form a manufactured object for one layer through a powder application step, a powder heating step, a sintering step, and an after-heating step, and to form a three-dimensional manufactured object by laminating the manufactured object for one layer;
    a camera that photographs a manufactured surface of the powder layer; and a determination unit configured or programmed to determine whether powder application failure of the powder material has occurred, the method comprising:

the powder application step of applying a powder material onto the build plate by moving the squeegee in a horizontal direction on the build plate to form the powder layer;

the powder heating step of preheating the powder layer on the build plate after the powder application step;

the sintering step of sintering the powder material forming the powder layer after the powder heating step; and the after-heating step of heating the powder layer on the build plate after the sintering step, wherein, in the powder application step, it is determined whether powder application failure of the powder material has occurred using images of the manufactured surface photographed by the camera while and immediately after the squeegee passes through the manufactured surface of the powder layer, wherein the determining whether powder application failure of the powder material has occurred uses an image photographed by the camera while the squeegee is passing through the manufactured surface to obtain a difference between a predicted feature value immediately after the squeegee passes and a feature value of an image immediately after the squeegee passes, the predicted feature value being predicted from a temporal change in a feature value of an image before the squeegee passes, and determines whether powder application failure of the powder material has occurred based on the obtained difference, and wherein the feature value of the image is at least one of intensity and saturation of the image.

* * * * *